No. 890,760. PATENTED JUNE 16, 1908.
J. D. DONOVAN.
CLUTCH MECHANISM FOR RAILWAY CAR AND LOCOMOTIVE WHEELS.
APPLICATION FILED SEPT. 6, 1907.
2 SHEETS—SHEET 2.
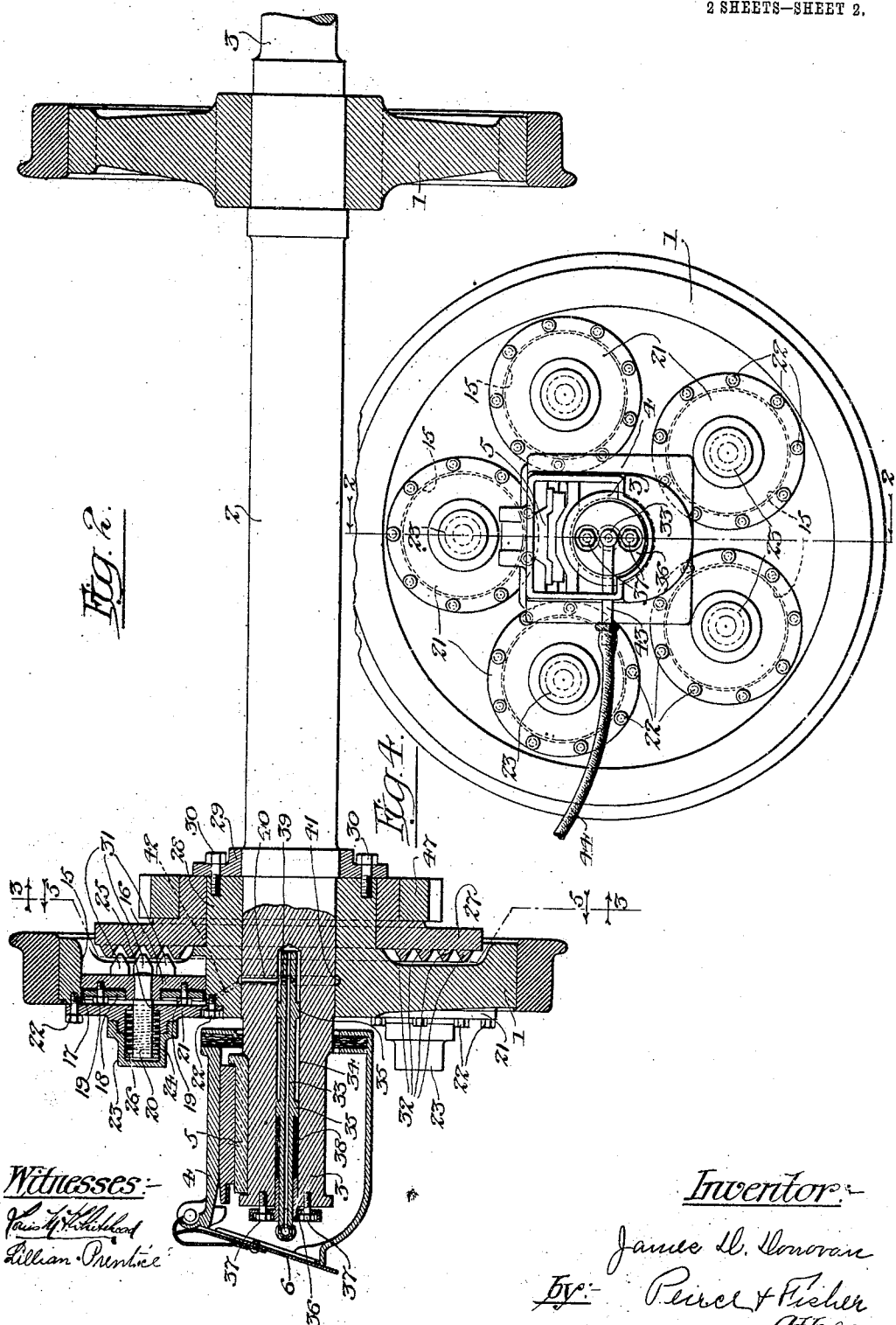

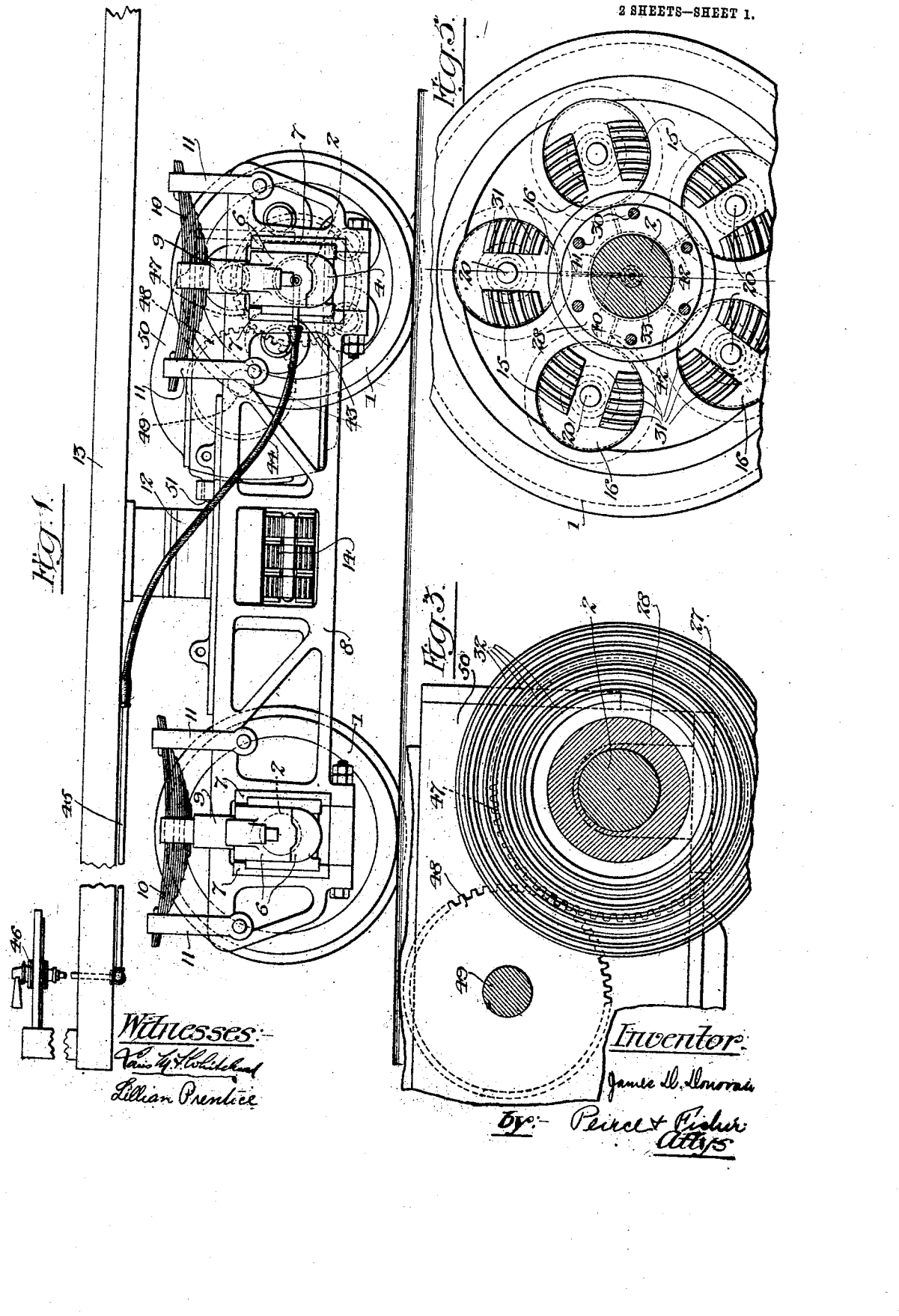

UNITED STATES PATENT OFFICE.

JAMES D. DONOVAN, OF KANSAS CITY, MISSOURI, ASSIGNOR OF ONE-THIRD TO WILLIAM F. DAVIS AND ONE-THIRD TO MILTON P. DAVIS, OF KANSAS CITY, MISSOURI.

CLUTCH MECHANISM FOR RAILWAY-CAR AND LOCOMOTIVE WHEELS.

No. 890,760.  Specification of Letters Patent.  Patented June 16, 1908.

Application filed September 6, 1907. Serial No. 391,592.

*To all whom it may concern:*

Be it known that I, JAMES D. DONOVAN, a citizen of the United States, and a resident of Kansas City, county of Jackson, and State of Missouri, have invented certain new and useful Improvements in Clutch Mechanism for Railway-Car and Locomotive Wheels, of which the following is a specification.

The invention relates to clutch mechanism for railway car and locomotive wheels and seeks to provide a simple and effective form of clutch mechanism which may be mounted directly on the wheel and wheel axle and controlled by fluid pressure for connecting motors or the like to the wheel axle.

Railway car and locomotive wheels are rigidly secured to the wheel axles and the axles are provided with suitable journal bearings that are connected by springs to the car truck or frame. It is essential that the car wheels and axle shall be yieldingly connected to the truck or frame so that the wheels may follow the irregularities of the track and at the same time yieldingly support the truck or frame. For this reason motors, pumps and the like, which are coupled to the wheel axle, must be so mounted as to maintain parallel relation with the wheel axle at all times.

The present invention seeks to provide an improved clutch mechanism which is mounted directly on the wheel and wheel axle together with suitable fluid pressure means for operating the same so that motors, pumps and the like mounted on or in parallel relation with the wheel axle, may be readily connected and disconnected therefrom as desired. It is customary to gear electric motors directly to the wheel axle but by providing a suitable friction clutch mechanism much smaller motors may be employed, particularly in hilly country, than would otherwise be necessary since the motor may be started when uncoupled from the axle and thrown into operation to move the full load after it has attained sufficient momentum. Moreover, by uncoupling the motor when the car is running down hill, considerable current is saved.

A further object of the invention is to provide a clutch and operating mechanism upon the car wheel and axle which will occupy a small amount of space. As stated, it is usual to mount electric motors directly upon the wheel axles, and as the space between the wheels is necessarily limited and largely occupied by the motor, it is highly desirable to provide a clutch mechanism which will occupy as little room as possible.

With these and other objects in view, the invention consists in the features of construction, combinations and arrangements of parts hereinafter set forth, illustrated in the accompanying drawings and more particularly pointed out in the appended claims.

In the drawings, Figure 1 is a view in elevation of a motor truck for railway cars to which the improved clutch is applied. Fig. 2 is a sectional view on line 2—2 of Fig. 4 through the car wheels and axle and through the improved clutch mechanism. Fig. 3 is a detail section on the line *a*—*a* of Fig. 2 looking in the direction of the arrows 3. Fig. 4 is a view in end elevation of the parts shown in Fig. 2 with the cover of the journal box removed. Fig. 5 is a detail view in section on the line *a*—*a* of Fig. 2 looking in the direction of the arrows 5.

The car wheels 1 are as usual, rigidly secured to the ends of the wheel axle 2. The end portions or journals 3 of the wheel axle extend beyond the wheels and are arranged within suitable journal boxes 4 having journal boxes 5 of any suitable form. The journal boxes are as usual, provided on their ends with swinging cover plates 6 and are mounted to slide in guide-ways upon the truck or frame of the car. In the form shown, the journal boxes are mounted to slide in guide-ways 7 on the truck frame 8 and carry the vertical posts 9, each of which is provided with a set of leaf springs 10. The truck frame is supported from the springs 10 by the links 11. In the form shown, a center bearing 12 for the car frame 13 is supported by springs 14 interposed between the bearing and the truck frame. It will be understood that the invention may be applied to other forms of trucks.

The body of the car wheel 1 is bored out to form a circular series of short cylinders 15 within which are arranged the pistons 16. Each of the pistons is provided with a packing 17 held in place by a ring 18 secured to the piston by bolts 19. Each piston is provided with a short rod 20 projecting outwardly through a cap plate 21 which is secured to the body of the car wheel by bolts 22 and a cup-shaped piece or thimble 23 extends over the end of the piston rod and is threaded upon the cap plate 21. The cap plate and thimble 23 are cored out to receive a coiled spring 24 which extends about the rod 20 and between a lip or shoulder 25 on the cap plate and a cross pin 26 in the outer end of the rod 20. These springs normally hold the pistons 16 in their outward or retracted position.

A clutch disk 27 is loosely mounted upon the hub 28 of the car wheel and is held in place by a collar 29 mounted on the axle and secured to the hub of the car wheel by bolts 30. Each of the pistons (see Figs. 2 and 5) is provided at its inner face with a series of segmental, V-shaped ribs or clutch teeth which are arranged to interlock with the corresponding series of annular, V-shaped ribs 32 on the outer face of the clutch disk 27 to frictionally lock the clutch disk to the car wheel. The pistons are shifted by compressed air, steam or other suitable fluid under pressure and for this purpose, a tube or pipe 33 is introduced into a longitudinal v extending bore centrally formed in the end of the axle. The tube 33 is somewhat smaller than the bore 34 but is provided with enlarged ribs or shoulders 35 snugly fitting the bore and a stuffing box 36 is arranged in the end of the bore about the tube and is secured to the axle by bolts 37. A packing 38 of suitable material is held in place between the stuffing box 36 and one of the shoulders 35 on the tube or pipe 33 so as to prevent leaking around the tube or pipe. The tube and axle are provided with communicating transverse passages 39 and 40 and the passage 40 opens into an annular groove or passage 41 formed on the inner face of the hub of the car wheel. From this annular passage a series of passages 42 (see Fig. 5) lead to the outer ends of the several cylinders 15.

At its outer end the pipe or tube 33 is provided with a laterally projecting portion 43 which extends outwardly through the side of the journal box 4, and a flexible pipe 44 connects the same with a pipe 45 on the car frame. Pipe 45 leads to a valve 46, which is preferably located at the motorman's position on the car and which is, in turn, connected to a suitable source of fluid under pressure so that by shifting the valve the motorman may at any time introduce fluid under pressure to the cylinders 15 of the car wheel and shift the pistons 16 thereon to securely engage the members of the friction clutch.

In the form shown, a gear 47 is secured to the clutch disk 27 and meshes with a gear 48 on the drive shaft 49 of a motor 50. The motor frame is mounted directly on the axle at one end and at its other end is provided with a lug 51 resting on the truck frame. The motor frame is thus free to move up and down with the wheel axle and at all times the motor shaft 49 remains in parallel relation with the wheel axle 2. The clutch mechanism occupies but little space upon the wheel axle and leaves ample room for the motor mechanism. The wheel axle 2, although rotatable and free to move to a slight extent in vertical direction relatively to the car truck and frame, is nevertheless provided with an effective friction clutch mechanism for connecting and disconnecting the motor and the wheel axle, and effective means are provided for operating the clutch mechanism by fluid pressure. The tube 33 by which fluid under pressure is introduced to set the clutch, is held against rotation in the end of the rotatable axle 2 but otherwise of course, moves with the axle. The stuffing box and packing arrangement effectively prevent leaking around the tube. The valve 46 should be provided with means whereby the pipes and passages leading to the cylinders 15, may be connected with a suitable source of fluid under pressure or with an exhaust to engage and disengage the members of the friction clutch. When the cylinders and passages leading thereto are connected to the exhaust, the springs 24 come into play to shift the pistons out of engagement with the clutch disk.

The clutch mechanism is of chief importance in connection with motor cars and the like, but may be also advantageously employed in connection with axle operated pumps, dynamos and the like. It is obvious that numerous changes may be made in the details set forth without departure from the essentials of the invention.

Having described my invention, what I claim as new and desire to secure by Letters Patent, is:—

1. The combination with a car or locomotive wheel and the axle whereon said wheel is fixed, of a gear loosely held on said axle adjacent said wheel, coöperating clutch members, one fixed to said gear and the other movably mounted on said wheel and means for operating said movable clutch member.

2. The combination with a railway car or locomotive wheel and an axle whereon the wheel is fixed, a gear loosely mounted on the wheel, a friction clutch for coupling said gear and wheel and means for operating said clutch by fluid pressure, substantially as described.

3. The combination with a railway car or locomotive wheel and axle whereon the wheel is fixed, of a gear loosely mounted on the axle adjacent the wheel, coöperating friction clutch members connected respectively to the gear and to the wheel and means for operating said clutch members by fluid pressure, substantially as described.

4. The combination of a railway car or locomotive wheel and axle whereon the wheel is fixed, said wheel having one or more cylinders formed therein, pistons in said cylinders, means for introducing fluid under pressure into said cylinders and a friction clutch operated thereby.

5. The combination of a railway car or locomotive wheel and axle whereon the wheel is fixed, said wheel having one or more cylinders formed therein, pistons in said cylinders, said wheel and axle having passages leading to said cylinders, a tube inserted in the end of said axle and communicating with said passages for introducing fluid under pressure to said cylinders, a stuffing box about said tube, and a clutch on said axle operated by said pistons, substantially as described.

6. The combination of a railway car or locomotive wheel and axle whereon the wheel is fixed, said wheel having one or more cylinders formed therein, pistons in said cylinders, a clutch friction-disk loosely mounted on said axle adjacent said wheel, coöperating friction clutch members mounted on said pistons and means for introducing fluid under pressure to said cylinders, substantially as described.

7. The combination of a car or locomotive wheel and axle whereon said wheel is fixed, said wheel having a series of cylinders formed therein, pistons in said cylinders, a clutch-disk loosely mounted on the axle adjacent said wheel, said disk and said pistons having coöperating frictional faces, and means for introducing fluid under pressure to said cylinders, substantially as described.

8. The combination of a car or locomotive wheel and axle whereon said wheel is fixed, said wheel having a series of cylinders formed therein, pistons in said cylinders, a clutch-disk loosely mounted on the axle adjacent said wheel, said disk and said pistons having interlocking ribs with inclined friction faces and means for introducing fluid under pressure to said cylinders, substantially as described.

9. The combination of a car or locomotive wheel and axle whereon said wheel is fixed, said wheel having a series of cylinders formed therein, pistons in said cylinders, a clutch-disk loosely mounted on the axle adjacent said wheel, said disk and said pistons having coöperating friction faces and means for introducing fluid under pressure to said cylinders including passages formed in said wheel and axle and a tube inserted in the end of said axle but held against rotation and communicating with said passages and a stuffing box about said tube, substantially as described.

10. The combination of a railway car or locomotive wheel and axle whereon the wheel is fixed, said wheel having one or more cylinders formed therein, pistons in said cylinders, a friction clutch controlled thereby, members for introducing fluid under pressure to said cylinders for setting said clutch and springs for retracting said pistons, substantially as described.

11. The combination of a railway truck, wheel axle and wheels fixed thereto, journal boxes for said axle movably mounted in said truck, a clutch member loosely mounted on said axle, a coöperating clutch member mounted on one of said wheels and means for operating said clutch members by fluid pressure, substantially as described.

12. The combination of a railway truck, wheel axle and wheels fixed thereto, journal boxes for said axle movably mounted in said truck, one of said wheels having a series of cylinders formed therein, pistons in said cylinders, a gear loosely mounted on said shaft adjacent said cylinders, a friction clutch controlled by said pistons for coupling said gear to said axle and means for introducing fluid under pressure to said cylinders, substantially as described.

13. The combination of a railway truck, wheel axle, wheels fixed thereto, journal boxes mounted to slide vertically in said truck and engaging said axle outside of said wheels, one of said wheels having a series of cylinders formed therein, pistons in said cylinders, a gear loosely mounted on the axle adjacent said wheel, a friction clutch controlled by said pistons for coupling said gear to the axle, said wheel and axle having passages leading to said cylinders for admitting fluid under pressure thereto, a tube leading to said passage inserted in the end of said axle but held against rotation and extending through one of said journal boxes and a stuffing box on the end of said axle about said tube, substantially as described.

14. The combination of a railway truck, wheel-axle, wheels fixed thereto, journal boxes for said axle movably mounted in said truck, a gear loosely mounted on said axle adjacent one of said wheels, a frame hung on said axle, a shaft journaled in said frame, a gear on said shaft meshing with the gear on the axle, coöperating friction clutch members, one fixed to the gear on the axle and the other movably mounted on the adjacent wheel, and means for operating the movable clutch member, substantially as described.

15. The combination of a railway truck, wheel axle, wheels fixed thereto, journal boxes for said axle movably mounted in said truck, a gear loosely mounted on said axle adjacent one of said wheels, a frame hung on said axle, a shaft journaled in said frame, a gear on said shaft meshing with the gear on the axle, a friction disk connected to the gear on the axle, a coöperating clutch member mounted on the adjacent wheel and means for operating said clutch member by fluid pressure, substantially as described.

16. The combination of a railway truck, wheel axle, wheels fixed thereto, journal boxes for said axle movably mounted in said truck, a gear loosely mounted on said axle adjacent one of said wheels, a motor hung on the axle and connected to the gear thereon, coöperating friction clutch members, one fixed to the gear on the axle and the other movably mounted on the adjacent wheel, and means for operating the movable clutch member, substantially as described.

17. The combination of a railway truck, wheel axle, wheels fixed thereto, journal boxes loosely mounted on said axle adjacent one of said wheels, a motor hung on the axle and having a motor shaft connected to said gear, a friction disk connected to said gear, a coöperating friction clutch-member mounted on the adjacent wheel and means for operating said clutch member by fluid pressure, substantially as described.

18. The combination of a railway truck, wheel axle, wheels fixed thereon, journal boxes for said axle movably mounted in said truck, a gear loosely mounted on said axle adjacent one of said wheels, a motor hung on said axle and having a motor shaft connected to said gear, a friction disk connected to said gear, the adjacent wheel having a series of cylinders formed therein and pistons in said cylinders having clutch members for engaging said disk, said wheel and axle having passages leading to said cylinders for admitting fluid under pressure thereto, substantially as described.

19. The combination of a railway truck, wheel axle, wheels fixed thereon, journal boxes for said axle movably mounted in said truck, a gear loosely mounted on said axle adjacent one of said wheels, a motor hung on said axle and having a motor shaft connected to said gear, a friction disk connected to said gear, the adjacent wheel having a series of cylinders formed therein, pistons in said cylinders having clutch members for engaging said friction disk, said wheel and axle having passages leading to said cylinders for the admission of fluid under pressure thereto, a tube inserted in the end of said axle and communicating with said passages and a stuffing box carried by the axle about said tube, substantially as described.

JAS. D. DONOVAN.

Witnesses:
HENRY ZELLARES,
DANIEL H. WHISMAN.